United States Patent [19]

Zall

[11] 3,977,969

[45] Aug. 31, 1976

[54] CONTAINMENT AND RIDDANCE OF OIL SPILLS

[75] Inventor: David M. Zall, Annapolis, Md.

[73] Assignee: The United States of America as represented by the Secretary of the Navy, Washington, D.C.

[22] Filed: Oct. 26, 1971

[21] Appl. No.: 192,305

[52] U.S. Cl. ............................ 210/40; 210/DIG. 26; 252/316
[51] Int. Cl.² ...................... B01D 15/00; C02B 1/14
[58] Field of Search ................. 210/40, DIG. 21, 54; 252/2

[56] References Cited
UNITED STATES PATENTS

| | | | |
|---|---|---|---|
| 3,229,769 | 1/1966 | Bashaw | 252/2 X |
| 3,252,899 | 5/1966 | Rice et al. | 210/40 |
| 3,407,138 | 10/1968 | Harper et al. | 252/2 |
| 3,567,660 | 3/1971 | Winkler | 210/40 |
| 3,657,125 | 4/1972 | Strickman | 210/DIG. 21 |
| 3,674,683 | 7/1972 | Rainer | 210/DIG. 21 |

*Primary Examiner*—Richard D. Lovering
*Attorney, Agent, or Firm*—R. S. Sciascia; Q. E. Hodges

[57] ABSTRACT

The invention is a method of clearing oil spills by chemically treating the surface of the oil spill with a polymer of high molecular weight having jelling properties thereby causing the oil to coagulate. The oil is then easily raked off the surface of the water.

4 Claims, No Drawings

CONTAINMENT AND RIDDANCE OF OIL SPILLS

The invention described herein may be manufactured and used by or for the Government of the United States of America for governmental purposes without the payment of any royalties thereon or therefor.

BACKGROUND OF THE INVENTION

The invention relates to a method for rapidly and efficiently clearing oil spills. Oil spills caused by defective offshore drilling equipment and ship accidents have created a problem for which no adequate solution has yet been found. Attempts have been made to physically surround said oil spills with mechanical floating barriers and the like. These containment methods are time consuming and require extensive equipment. In contrast the present invention provides a quick and efficient solution to the oil spill problem.

High ensity polymers have been used with water for drag reduction in fire-fighting and in treatment of nursery plants. The use of polymer of high molecular weight to deal with oil pollution is not known to have been utilized before the instant invention.

SUMMARY OF THE INVENTION

The invention consists of treating the surface of the oil spill with a polymer of high molecular weight which will coagulate the oil, thus forming a barrier between the oil and the water. Surface oil can then be raked and skimmed off the surface of the water.

OBJECTS OF THE INVENTION

It is a principle object of this invention to remove oil spills.

It is a further object of the instant invention to provide oil spill removing means not requiring extensive mechanical equipment.

It is still another object of the instant invention to provide a method whereby the finally contained oil is in such a form that it may be easily removed.

DESCRIPTION OF THE PREFERRED EMBODIMENT

The invention consists of a method of removing oil spills by coagulating the oil, thereby providing a barrier between the oil and the water and leaving the oil in such a condition that it may be easily disposd of. The method comprises spreading a polymer of high molecular weight by itself, and/or in conjunction with a coagulant or absorbent such as finely divided carbon on the oil spill. The oil coagulates thus forming a chemical barrier between the oil and the water. Finely divided carbon will cause the coagulated oil to further lump for easy removal. Several polymers of high molecular weight provide the desired jelling effect, for example: the polymer of polyethylene-oxide, known commercially as "Polyox"; and the polymer of polyacrylamide. The mechanical problem of manipulating the oil is greatly minimized. The coagulated oil, as a semisolid, can be easily scooped from the surface. Various techniques presently exist for raking or skimming such a semi-solid from the water.

The coagulated oil which has been easily removed can then be transferred to a carbon bed which will retain the oil and the polymer. Coagulated oil may be disposed of in other ways such as burning at a remote point or by other well-known disposal schemes.

It is understood that the invention is not limited to the exact details described for obvious modifications will occur to persons skilled in the art. It is therefore to be understood that within the scope of the appended claims the invention may be practiced otherwise than as specifically described.

What is claimed is:

1. A method of removing oil spills from water which comprises:
   treating the oil spill with a high molecular weight polymer selected from the group consisting of the polymer of polyethylene-oxide and the polymer of polyacrylamide; and skimming off the coagulated oil from the water.

2. The method of claim 1 wherein said treating comprises spreading the polymer of high molecular weight on the surface of the oil spill.

3. The method of claim 1 further including the step of treating the oil spill with an absorbent before skimming off the coagulated oil.

4. The method of claim 3 wherein said absorbent is finely divided carbon.

* * * * *